United States Patent
Gavriliu et al.

(10) Patent No.: US 6,828,966 B1
(45) Date of Patent: Dec. 7, 2004

(54) METHOD OF DERIVING MESH SURFACE REPRESENTATION FROM VOLUME REPRESENTATION

(75) Inventors: Marcel Gavriliu, Pasadena, CA (US); Joel Carranza, Ocean Springs, MS (US); David E. Breen, Arcadia, CA (US); Alan H. Barr, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 175 days.

(21) Appl. No.: 10/136,866

(22) Filed: Apr. 29, 2002

Related U.S. Application Data

(60) Provisional application No. 60/287,023, filed on Apr. 27, 2001.

(51) Int. Cl.$^7$ .............................................. G06T 17/00
(52) U.S. Cl. ...................................................... 345/420
(58) Field of Search ................................ 345/419, 420, 345/423, 424; 382/128, 131, 154

(56) References Cited

U.S. PATENT DOCUMENTS

| | | | | |
|---|---|---|---|---|
| 5,760,779 A | * | 6/1998 | Yamashita et al. | 345/421 |
| 5,901,247 A | * | 5/1999 | Osbourn et al. | 382/225 |
| 6,133,921 A | * | 10/2000 | Turkiyyah et al. | 345/420 |
| 6,246,784 B1 | * | 6/2001 | Summers et al. | 382/128 |
| 6,345,112 B1 | * | 2/2002 | Summers et al. | 382/128 |
| 6,384,826 B1 | * | 5/2002 | Bern et al. | 345/441 |
| 6,476,803 B1 | * | 11/2002 | Zhang et al. | 345/419 |
| 6,556,696 B1 | * | 4/2003 | Summers et al. | 382/128 |

OTHER PUBLICATIONS

Gavriliu, et al. *Fast Extraction of Adaptive Multiresolution Meshes With Guaranteed Properties From Volumetric Data*, Proceedings of IEEE Visualization 2001, Oct., 2001 pp. 295–302.

Lorensen. W.E. and Cline, H.E., *Marching Cubes : A High Resolution 3D Surface Reconstruction Algorithm*, Computer Graphics, vol. 21, No. 4, pp. 163–169, 1987 (reprinted, pp. 347–353).

De Berg, M. et al., *Computational Geometry: Algorithms and Applications*, Chapter 7, 2nd Edition, Springer–Verlag 2000, pp. 147–163.

* cited by examiner

*Primary Examiner*—Wilson Lee
*Assistant Examiner*—Huedung X. Cao
(74) *Attorney, Agent, or Firm*—Howrey, Simon Arnold & White, LLP

(57) ABSTRACT

A method of extracting a mesh representation of a surface from a volumetric representation of at least a portion of an object is provided. A surface is derived from the volumetric representation. A seed point on the surface is then selected, and a neighborhood of the seed point is grown over at least a portion of the surface. These selection and growing steps are iteratively repeated until the entire surface is substantially completely covered. Seed points are then selectively connected to form polygons which comprise the mesh representation.

40 Claims, 12 Drawing Sheets

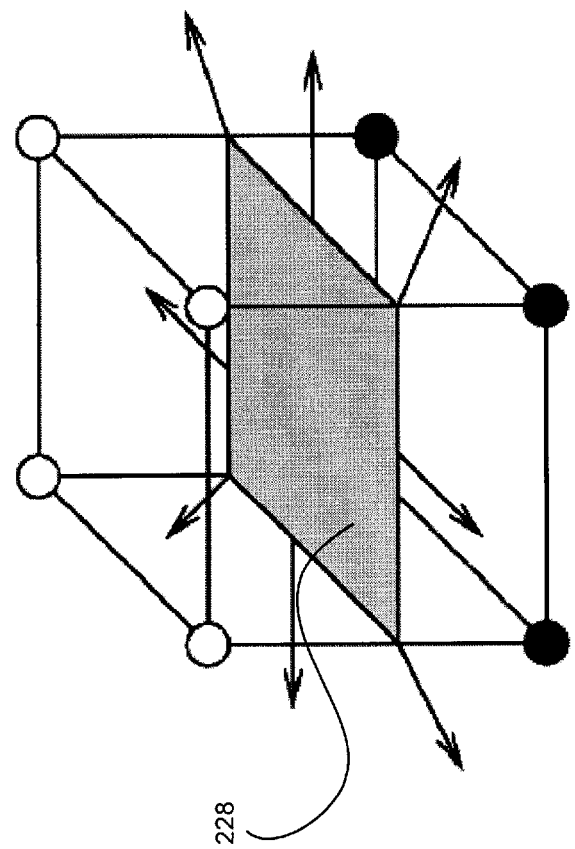
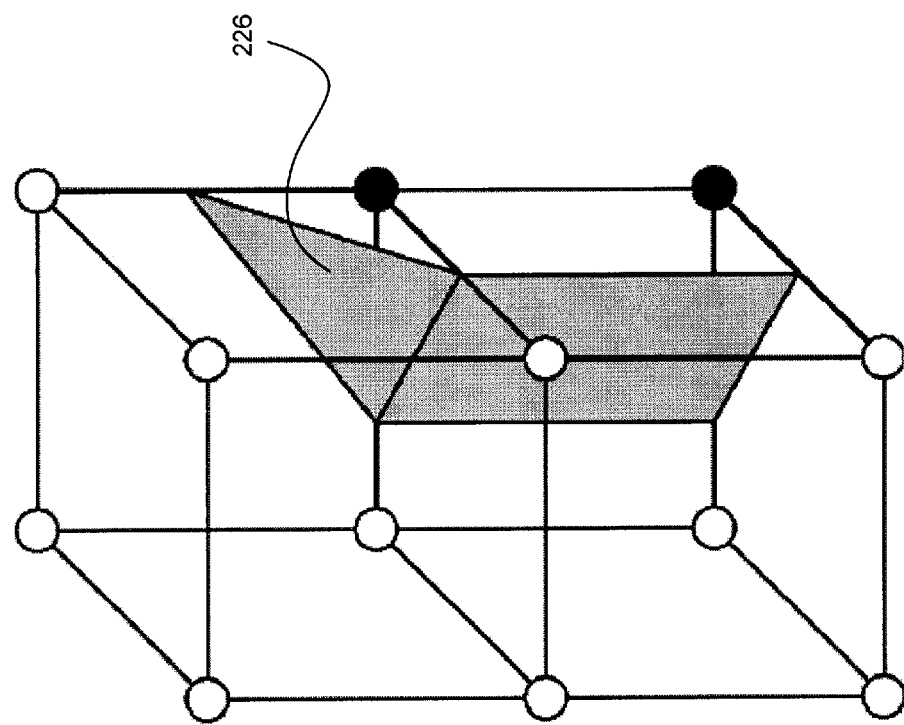
FIGURE 2D
FIGURE 2C

FIG. 7A 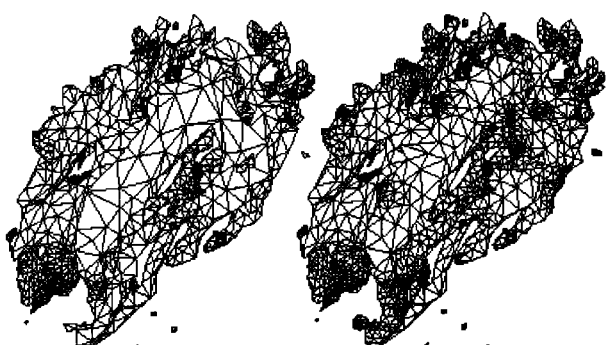 FIG. 7B
FIG. 7C 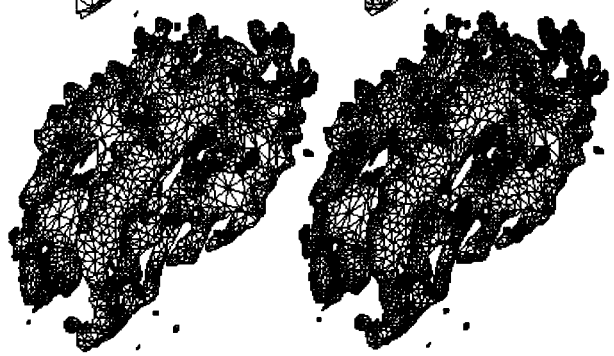 FIG. 7D

US 6,828,966 B1

METHOD OF DERIVING MESH SURFACE REPRESENTATION FROM VOLUME REPRESENTATION

This application claims the benefit of U.S. Provisional Application No. 60/287,023, filed Apr. 27, 2001, which is hereby fully incorporated by reference herein as though set forth in full.

This provisional application is substantially reprinted in the following publication: Marcel Gavriliu at al, "Fast extraction of adaptive multiresolution meshes with guaranteed properties from volumetric data," *Proceedings of IEEE Visualization* 2001, October 2001, pp. 295–302. This publication is hereby fully incorporated by reference herein as though set forth in full.

The U.S. Government has certain rights in this invention pursuant to Grant Number F49620-96-1-0471 awarded by the Air Force (AFOSR) and Grant Numbers ASC-86-20219 and ACI-9982273 awarded by the National Science Foundation.

FIELD OF THE INVENTION

This invention relates to the fields of mesh representations of object surfaces and volumetric representations of object volumes, and, more specifically, to deriving a mesh representation of a surface from a volumetric representation of an object.

RELATED ART

Volumetric representations of objects are generated in many applications, such as medical imaging and laser scanning. In these applications, a volume of a three dimensional object is typically represented by data in the form of volume elements ('voxels'), each associated with a point in space and a value known as an iso-value representative of a characteristic or quality of the object at the point in space. For example, in magnetic resonance imaging, a volumetric representation of at least a portion of the human body is formed, comprising a plurality of voxels, in which the iso-value associated with each voxel is the intensity of the image at the point in space corresponding to the image.

It is often desirable to be able to extract from the volumetric representation a representation of a particular surface within the volume represented by the volumetric representation. For example, in the field of magnetic resonance imaging, a physician may want to extract and display a surface representation of a selected organ, such as the brain or the heart, from a volumetric representation of the upper torso and head of a human body. Moreover, a mesh representation, i.e., a representation in which an object surface is represented by a plurality of tessellated polygons such as triangles, is often a convenient form for representing object surfaces because it can be easily refined to more detailed levels of resolution in a hierarchical fashion depending on the application involved. The hierarchical arrangement facilitates applications involving progressive resolution, such as Web applications in which it is desired to rapidly display a coarse representation of object which is the progressively filled in at higher levels of resolution.

A so-called 'Marching Cubes' algorithm, described in W. E. Lorenson and H. E. Cline, "Marching Cubes: A High Resolution 3D Surface Construction Algorithm," *Computer Graphics(Proceedings SIGGRAPH '87*), 21(4), 163–169, July 1987, is presently available for extracting a meshed triangle representation from a volumetric representation. However, the triangular representation formed by this method often represents an object surface with an excessive number of triangles, and also with triangles with bad aspect ratios, i.e., aspect ratios which are likely to lead to loss of precision. Mesh representations utilizing an excessive number of triangles lead to inefficiency because they require more time to display and more resources to store. Moreover, mesh representations utilizing triangles with bad aspect ratios are disfavored because they can cause instability problems in down stream applications such as finite element simulation.

SUMMARY

The invention provides a method of extracting a mesh representation of a surface from a volumetric representation of at least a portion of an object. A surface is derived from the volumetric representation. Then, a seed point on the surface is selected and, subject to any applicable constraints, the neighborhood of the point is grown to cover a portion of the surface. If any constraints are applicable and encountered during this process, the growth is halted, and the size of the neighborhood reduced by a specified amount. If any portions of the surface remain uncovered, the process iterates by selecting additional seed points, and growing additional neighborhoods in like manner to the process described, until the surface is substantially completely covered. Polygons are then formed by selectively connecting seed points with connectors. These polygons form a mesh representation of the surface. In one implementation, the polygons are formed using a surface Delaunay triangulation algorithm.

Other systems, methods, data structures, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIGS. 2B–2D illustrate additional examples of isosurfaces and related voxels.

FIGS. 7A–7D illustrate mesh representations of the human brain having progressively refined resolutions.

DETAILED DESCRIPTION

As utilized herein, terms such as "about" and "substantially" are intended to allow some leeway in mathematical exactness to account for tolerances that are acceptable in the trade, e.g., any deviation upward or downward from the value modified by "about" or "substantially" by any value in the range(s) from 1% to 20% of such value.

Moreover, the term "memory" refers to any processor readable medium including but not limited to RAM, ROM, PROM, EPROM, EEPROM, hard disk, floppy disk, CD-ROM, DVD, flash memory, etc., and the term "processor" refers to any device capable of performing tasks through execution of a series of instructions, including but not limited to a general-purpose microprocessor, a special-purpose microprocessor, a finite state machine, a controller, and the like. Also, the term "logic" refers to any implementation in hardware, software, or a combination of hardware and software.

Figure 1:
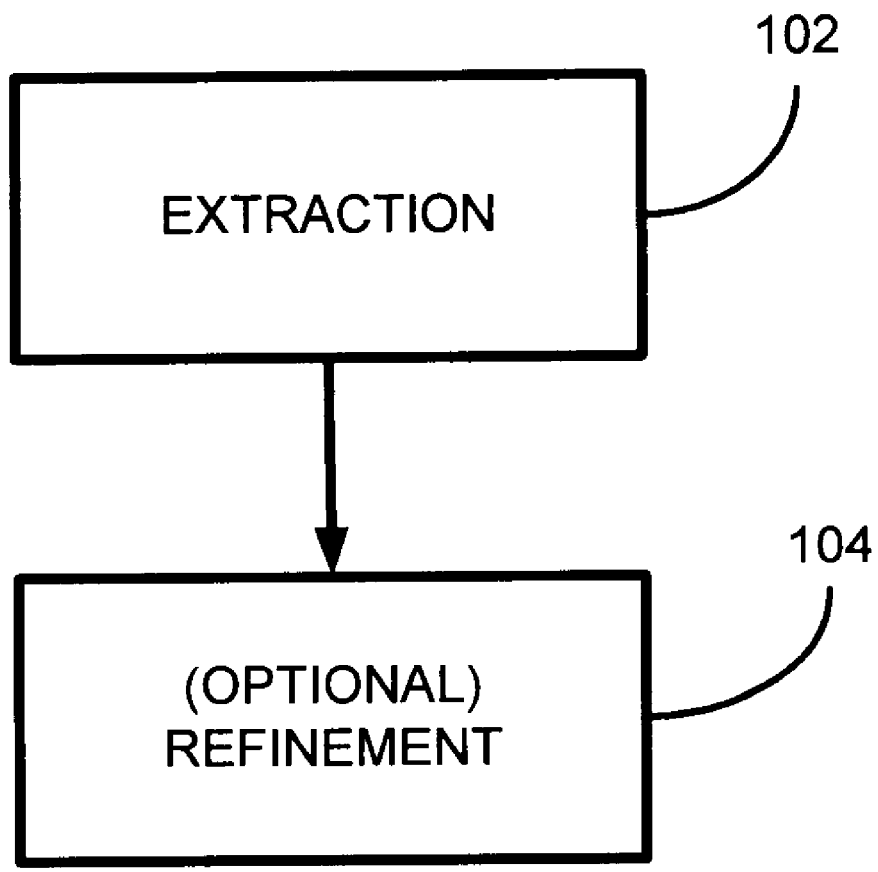
FIG. 1 is a simplified flowchart of an embodiment of a method according to the invention in which an extraction step is followed by an optional refinement step.

Referring to FIG. 1, an embodiment of a method according to the invention is illustrated. The method begins with step 102, which comprises extracting a mesh representation of a surface from a volumetric representation of at least a portion of an object. The mesh representation may comprise a plurality of tessellated polygons substantially spanning a surface derived from the volumetric representation. The polygons may be triangles, or may comprise some other polygons.

The extracting step may be performed through one or more local operations on a surface derived from the volumetric representation. In contrast to a procedure employing global optimization or the like, extraction performed using local operations is more efficient and conserving of system resources.

The mesh representation which results may be adaptive, meaning that the density of the triangles or polygons in the mesh representation may vary with the level of detail in the underlying topography which is represented, with a higher density being used to represent detailed features, and a lower density used to represent coarser features. Furthermore, the mesh representation should preserve the genus of the underlying topology.

Compared to a mesh representation which results from the Marching Cubes algorithm, the mesh representation resulting from the foregoing extracting step may have fewer triangles or polygons. Moreover, the resulting triangles or polygons may have better aspect ratios that those resulting from the Marching Cubes algorithm.

A user may specify one or more constraints or conditions, and the extracting step performed with these constraints or conditions in mind. Some examples of constraints or conditions which may be specified include maximum error between the mesh representation and the surface being represented, minimum or maximum polygon or triangle count, and a topology related constraint, requiring production of the coarsest mesh representation while still preserving the underlying topology.

When the extracting step is performed, an effort may be made to extract a mesh representation which satisfies as many of these constraints or conditions as possible. However, in certain cases, it may be impossible to satisfy all the specified conditions. For example, it may be impossible to meet a requirement specifying a maximum number of triangles in a triangular mesh representation while faithfully preserving the topology of the underlying surface. In this event, an effort may be made to satisfy as many of the constraints as possible.

Furthermore, it may be impossible or impractical to satisfy some or all of the specified conditions through performance of the extracting step 102. In this case, optional refinement step 104 is performed, to refine the mesh representation resulting from step 102 in an effort to satisfy the unfulfilled conditions or constraints.

Consider, for example, a global constraint specifying the maximum number of triangles in a triangular mesh representation. Since the extraction step 102 is generally performed through local operations on the surface, it may be impossible to confirm, merely by performance of the extracting step, satisfaction of a condition such as this expressed in global terms. In this event, the subsequent refinement step may be performed to confirm satisfaction of the global constraint.

Figure 2A:
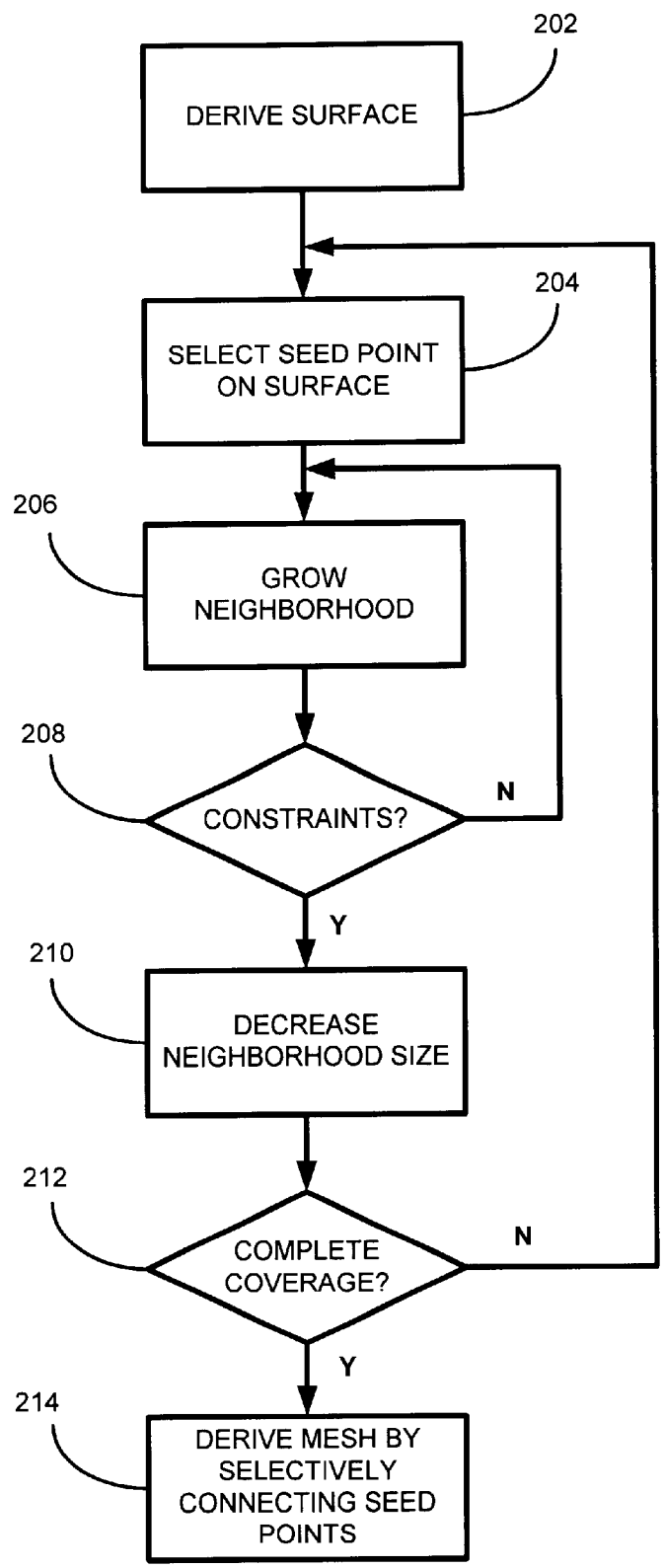
FIG. 2A is a simplified flowchart of an embodiment of a method for extracting a mesh representation of a surface from a volumetric representation of an object.

Referring to FIG. 2A, a flowchart of one embodiment of a method of extracting a mesh representation of a surface from a volumetric representation of at least a portion of an object is illustrated. The volumetric representation in this embodiment may comprise a plurality of voxels, each associated with a point in space and having an iso-value.

In this embodiment, the method begins with step 202, which comprises deriving a surface from the volumetric representation. In one example of this step, a user specifies an iso-value which is characteristic of a surface, and the volumetric representation is in the form of voxels. The voxels having iso-values which equal or correspond to the specified value are identified and used to form a surface which can be referred to as an "iso-surface." If the iso-value for a voxel equals the specified value, the iso-surface may pass directly through the voxel. If the iso-values of two adjacent voxels bound the specified value, an interpolation procedure may be invoked, whereby the iso-surface passes between the two voxels and is spaced from each voxel in proportion to the absolute value of the difference between the specified value and the value associated with the voxel.

Figure 2B:
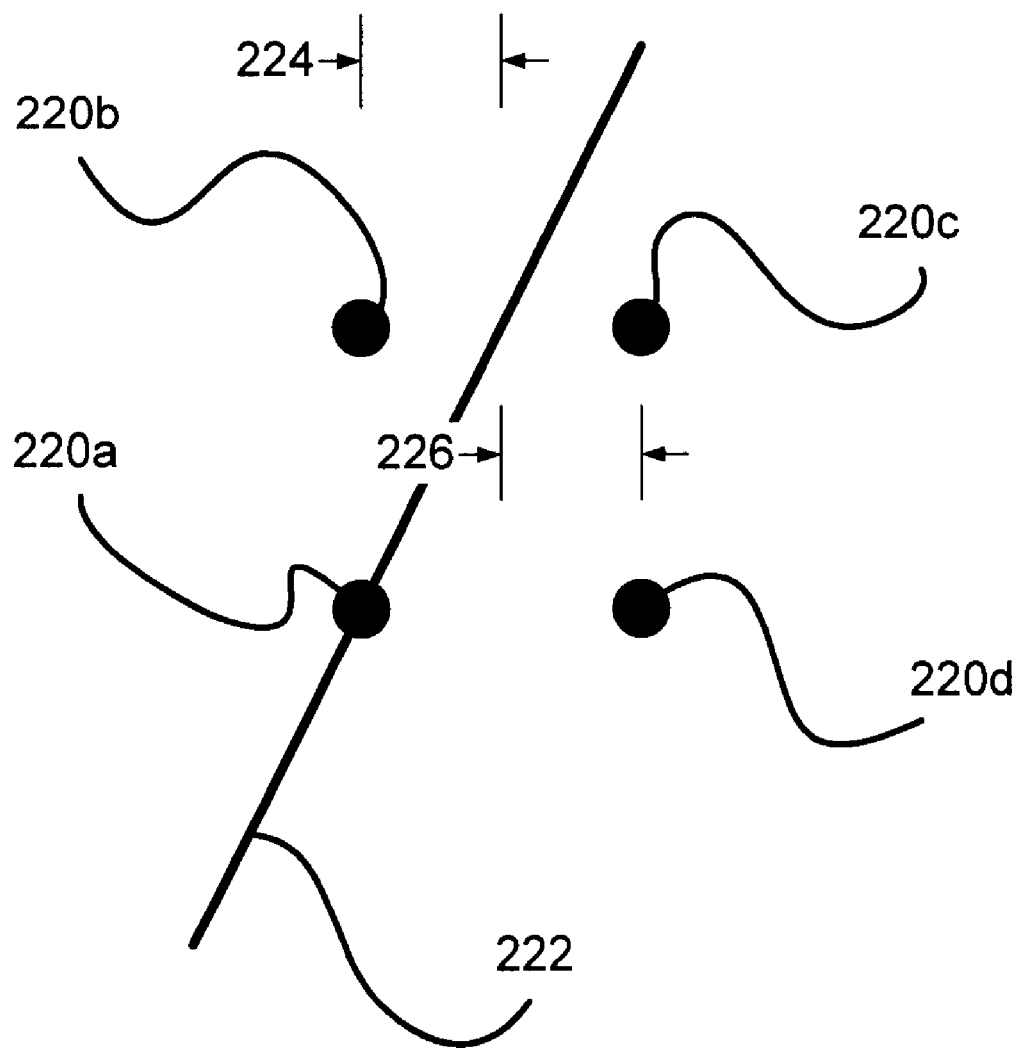

FIG. 2B is a side view of an example of an iso-surface 222 derived from a plurality of voxels 220a, 220b, 220c, and 220d. Voxel 220a is assumed to be associated with the same iso-value as that specified for the iso-surface 220. Accordingly, iso-surface 222 passes directly through voxel 220. On the other hand, the iso-values associated with voxels 220b and 220c are assumed to bound the iso-value associated with the iso-surface 222. Accordingly, the iso-surface 222 passes between these two voxels, such that the distance between voxel 220b and iso-surface 222, identified in the figure with numeral 224, is proportional to the absolute value of the difference between the iso-value associated with voxel 220b and that associated with iso-surface 222, and the distance between voxel 220c and iso-surface 222, identified in the figure with numeral 226, is proportional to the absolute value of the difference between iso-value associated with voxel 220c and that associated with iso-surface 222.

FIG. 2C illustrates an another example of an iso-surface 226 and related voxels, and FIG. 2D illustrates a third example of an iso-surface 228 and related voxels.

Returning to FIG. 2A, from step 202, the method proceeds to step 204. In step 204, a seed point on the surface derived in step 202 is selected. Step 206 is then performed. In step 206, the neighborhood of the seed point selected in step 204 is grown. The shape and form of the neighborhood is arbitrary, but it is often convenient to utilize uniform objects such as disks or spheres which are easy to characterize. In applications in which the portions of the surface being covered are isomorphic to a plane, it is convenient to employ disks as the covering objects. Disks are convenient since they can be characterized by only two parameters, a point of origin and a radius.

From step 206, the method proceeds to step 208, which inquires whether the neighborhood encounters any constraints or conditions as it is grown. If not, the method loops back to step 206, and continues growing the neighborhood. If so, the method proceeds to step 210, which comprises decreasing the size of the neighborhood until the constraint or condition is no longer violated. In the case in which the neighborhood is in the shape or form of a disk, this step may comprise decreasing the radius of the disk by a predetermined amount, e.g., 50%.

Several conditions or constraints may be applicable depending upon the application and user preferences. One constraint or condition which may be imposed, particularly in the case in which shape or form of the neighborhood which is grown is a disk, relates to a requirement that a disk cover a portion of the surface which is isomorphic to a plane. This constraint, if applicable, limits the growth of the disk so that it avoids covering those portions of the surface which are not isomorphic to a plane.

Figure 3A:
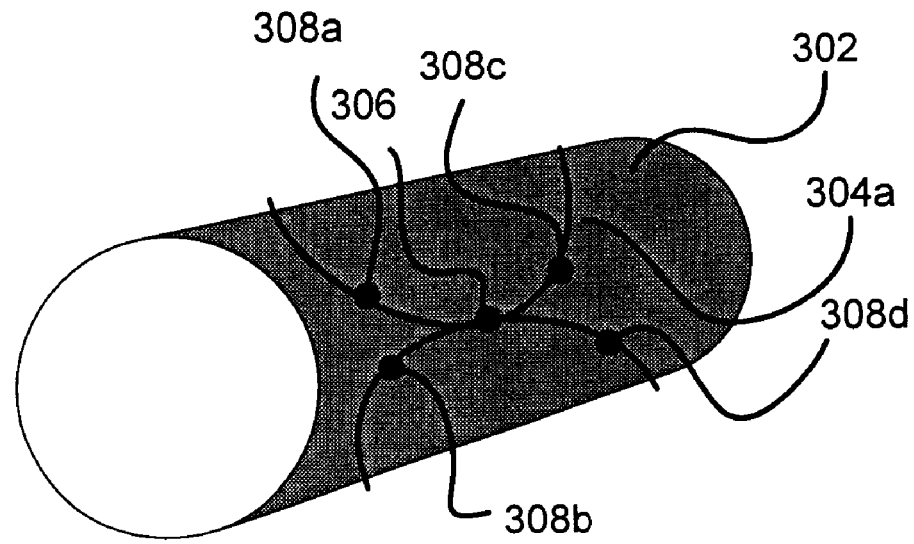
FIGS. 3A–3B illustrate a condition whereby a disk boundary contacts itself, thus indicating that the disk no longer covers a surface which is isomorphic to a plane.
Figure 3B:
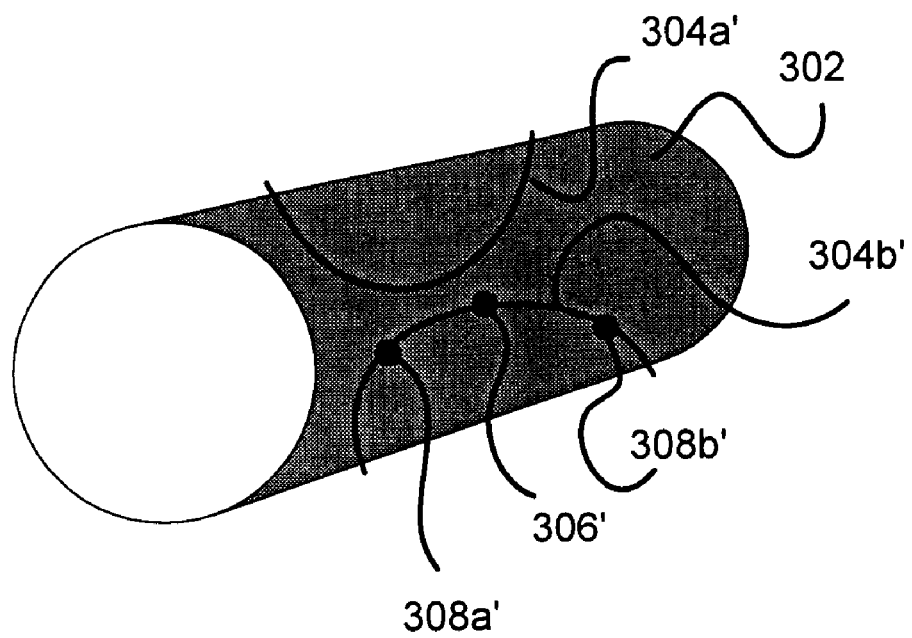

In one implementation, this condition may be detected by monitoring whether the boundary of the disk touches itself as the disk is grown. Referring to FIG. 3A, surface 302, and portions 304a, 304b of a disk boundary are illustrated. The portions 304a, 304b touch each other at point 306. This touching condition can be detected by determining that point 306 on the disk boundary has four neighbors, identified with numerals 308a, 308b, 308c, and 308d. This is to be contrasted with the situation illustrated in FIG. 3B. There, surface 302 is again depicted, along with portions 304a' and 304b' of a disk boundary which do not contact one another. As can be seen, point 306' along boundary portion 304b' has only two neighbors, identified respectively with numerals 308a' and 308b'. (The same condition applies to each of the other points along the disk boundary.)

Thus, in this implementation, a disk may be incrementally grown, and after each stage in growth, the points along the disk boundary are analyzed to determine if any have four neighbors. If so, it is determined that the surface covered by the disk is no longer isomorphic to a plane, and the radius of the disk reduced by a predetermined amount. If not, it is determined that the surface covered by the disk continues to be isomorphic to a plane, and the growth of the disk may be allowed to continue unabated.

Another constraint or condition which may be imposed in the case of a mesh representation composed of triangles is the requirement that the aspect ratio of each of the triangles, i.e., the ratio of the longest to the shortest side of the triangle, be at or below a predetermined value, e.g., 2 or 3. This constraint or condition, if applicable, limits the size of a disk so that the resulting triangles have good aspect ratios, i.e., aspect ratios equal to or below the specified value.

Figure 4:
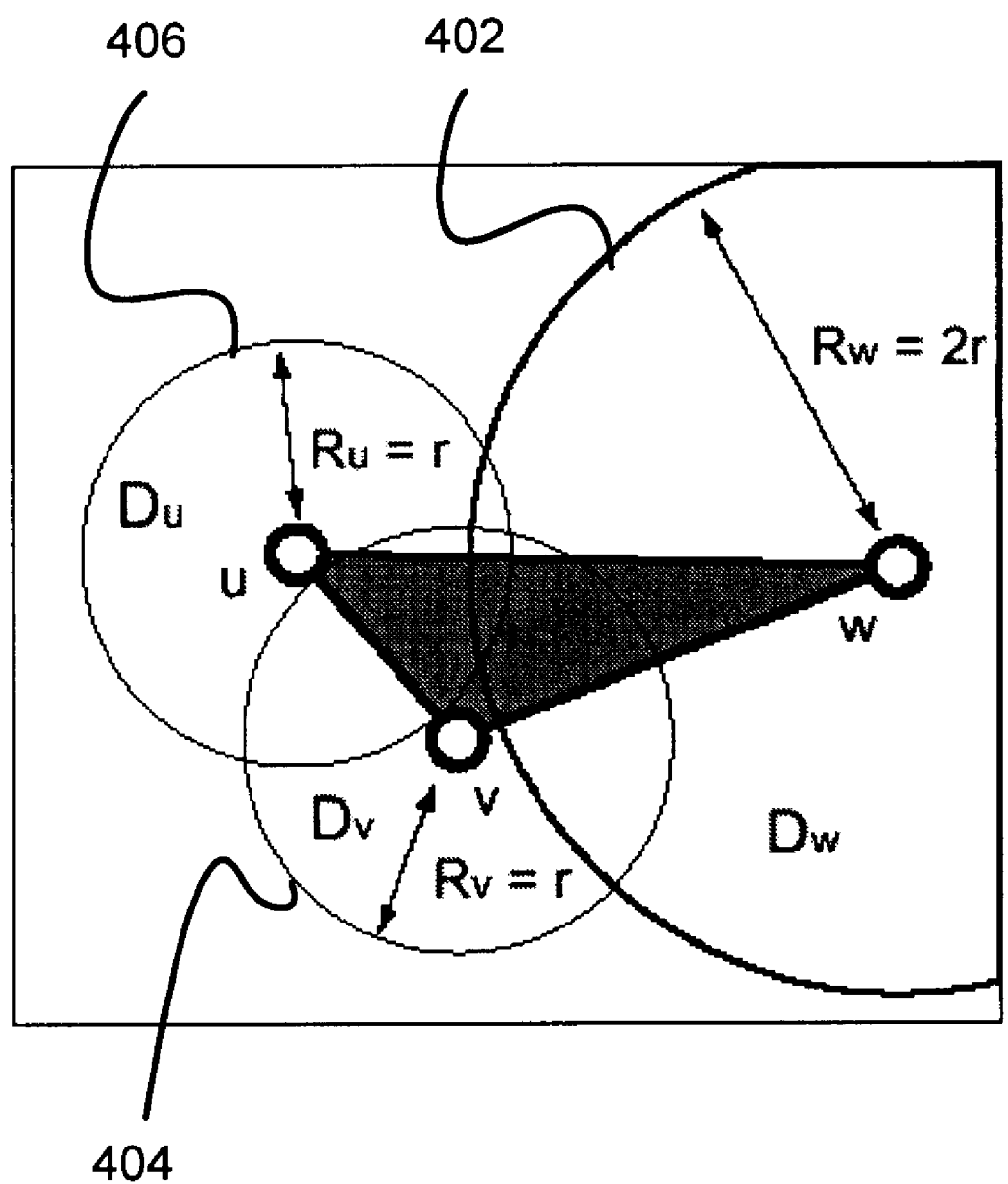
FIG. 4 illustrates a condition whereby the ratio of the radii of intersecting disks is determined to be less than or equal to a predetermined ratio, thereby complying with a triangle aspect ratio restriction.

In one implementation, this step may be performed by monitoring the ratios of the radii of intersecting disks. If the ratio equals or exceeds a predetermined value, e.g., 2 or 3, the radius of the larger of the two disks may be reduced by a predetermined amount, i.e., 50%. Referring to FIG. 4, an example of three intersecting disks 402, 404 and 406 is illustrated. The radius of disk 402 is 2r; that of disk 404 is r; and that of disk 406 is r. If the predetermined value is 3, the radius of disk 402 need not be reduced since the ratio of the radii of disks 402 and 404 (or 406) equals 2, which is less than the predetermined value.

Figure 5A:
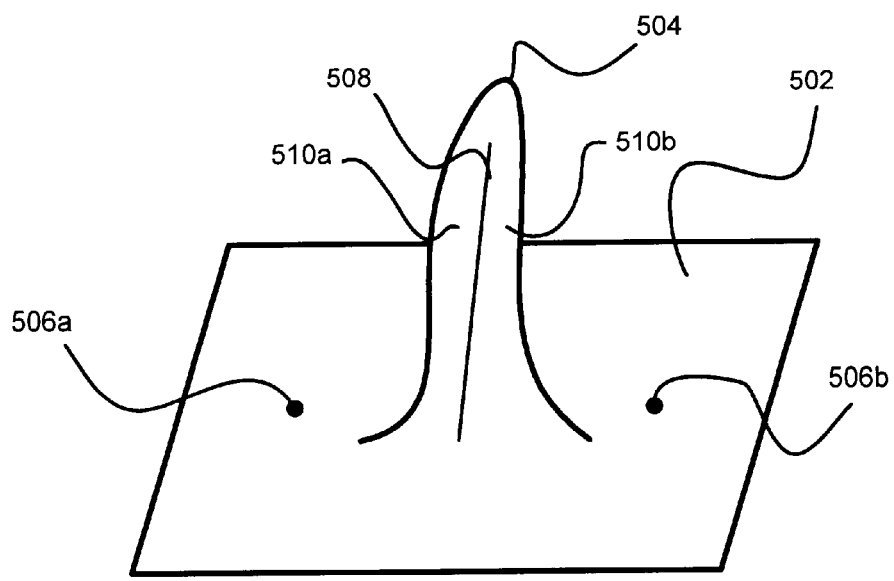
FIGS. 5A–5B illustrate a condition whereby regions on the surface are separated by two disk boundaries, thereby indicating that the resulting mesh representation is unlikely to be topologically correct.
Figure 5B:
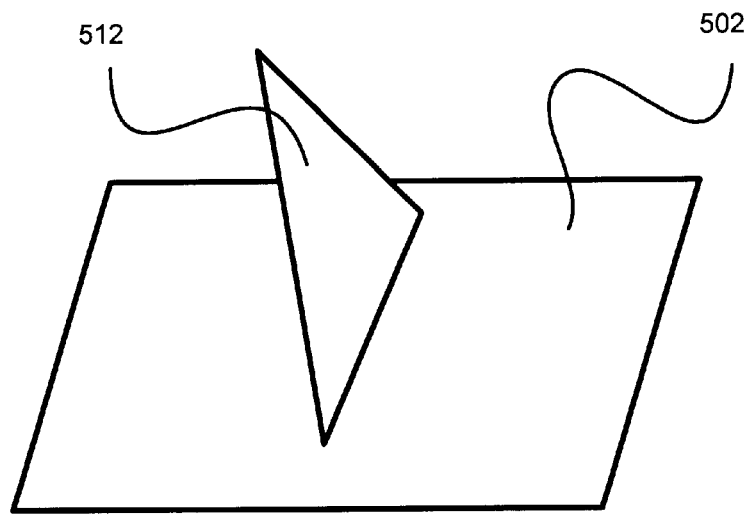

A third constraint or condition which may be imposed is the requirement that regions on the surface be separated by no more that one neighborhood boundary. This requirement may be implicated in applications, such as that illustrated in FIG. 5A, in which sharp bumps or protuberances, such as that identified with numeral 504, are present on the surface 502 which is to be represented by the mesh representation. In applications such as these, there is a risk that disks originating at the base of the protuberance, such as at seed points 506a and 506b, will, when grown, meet at a common boundary 508. When this occurs, the two regions 510a and 510b on either side of the protuberance will be separated by two disk boundaries, which violates the constraint. This condition is undesirable because it results in the protuberance 504 being represented by a single polygon or triangle 512, as illustrated in FIG. 5B, which is not topologically correct. Therefore, when this condition is detected, the radii of the disks originating from the seed points 506a and 506b may be reduced by a predetermined amount so that the condition is satisfied.

Referring back to FIG. 2A, from step 210, the method proceeds to step 212. There, an inquiry is made whether the surface derived in step 202 is substantially completely covered by the neighborhoods which have been grown around the seed points. (In one implementation, this step requires that the surface be completely covered before proceeding to step 214). If not, the method loops back to step 204 to perform anther iteration of the steps of selecting a seed point on the surface, and growing the neighborhood of the seed point until any applicable constraints or conditions are encountered (steps 204–210). If so, the method proceeds to step 214.

In step 214, the seed points are selectively connected to form the polygons which comprise the mesh representation of the surface. In some cases, there may be ambiguity regarding which seed points to connect. For example, consider the situation illustrated in FIGS. 6A and 6B, in which four disks 600a, 600b, 600c, and 600d have been grown on a surface. The four seed points (which happen to form the disk origins), identified with numerals 602a, 602b, 602c, and 602d, may be connected to form the two triangles 604a and 604b illustrated in FIG. 6A. Alternatively, these seed points may be connected to form the two triangles 604c and 604d illustrated in FIG. 6B.

To resolve this ambiguity, it may be useful to form a Voronoi diagram with the seed points 602a, 602b, 602c, and 602d forming the point sites in the Voronoi diagram. (Voronoi diagrams are known and described in many sources, for example, Chapter 7 of Mark de Berg et al., "Computational Geometry: Algorithms and Applications," Second Edition, $2^{nd}$ rev., ed. 2000, published by Springer-Verlag, which is hereby fully incorporated by reference herein as though set forth in full). Such a diagram is identified with numeral 606 in FIGS. 6C and 6D. This diagram may be useful for resolving the ambiguity illustrated in relation to FIGS. 6A and 6B. In particular, once the diagram has been created, a surface Delaunay triangulation algorithm may be performed, whereby only those seed points which imply bisecting an edge of the Voronoi diagram are connected. If the connector would not bisect an edge of the Voronoi diagram, the seed points are not connected in this particular implementation.

Figure 6A:
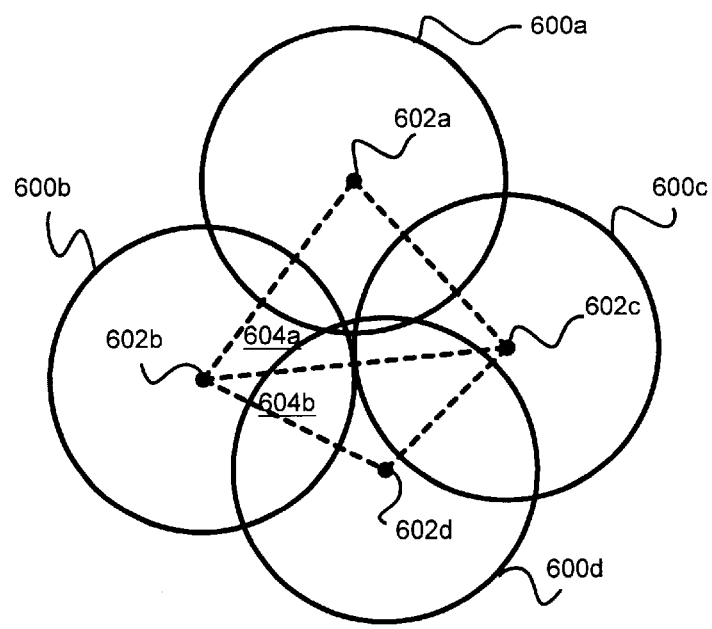
FIGS. 6A–6B illustrate an example of an ambiguity whereby the origins of adjacent disks may be connected in different ways, thereby generating different meshed triangle representations.
Figure 6B:
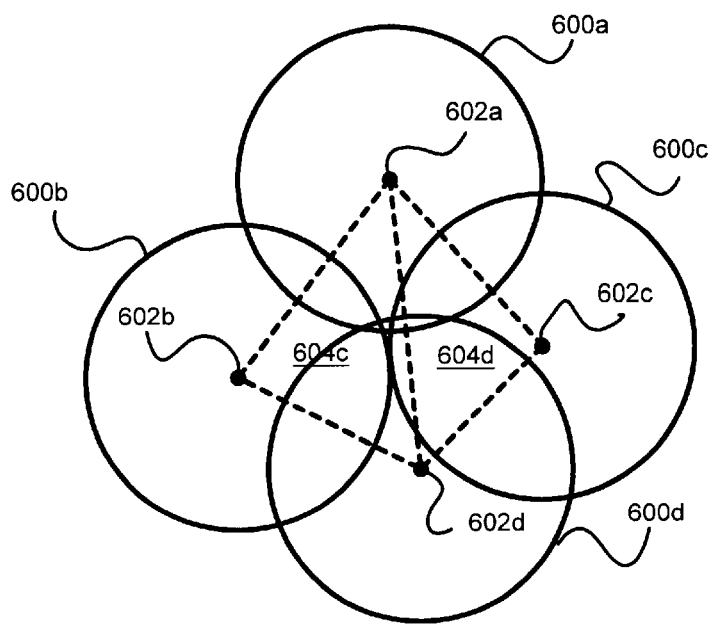
Figure 6C:
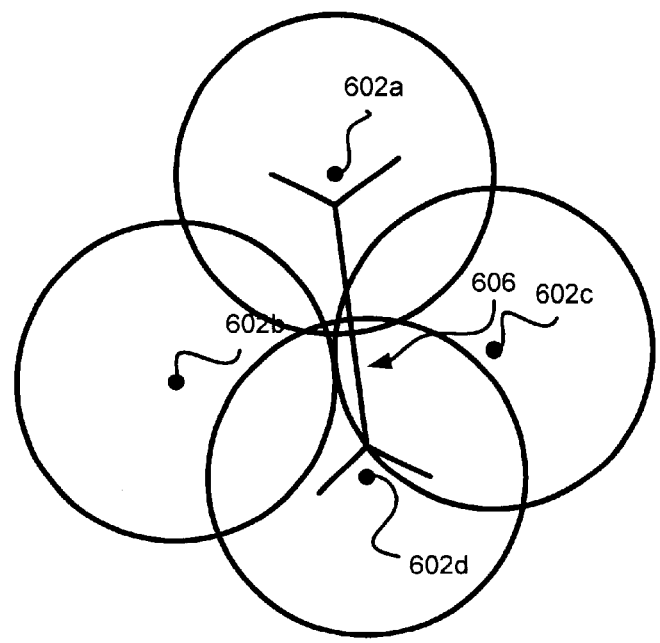
FIGS. 6C–6D illustrate how a Voronoi diagram can resolve the ambiguity illustrated in FIGS. 6A–6B.
Figure 6D:
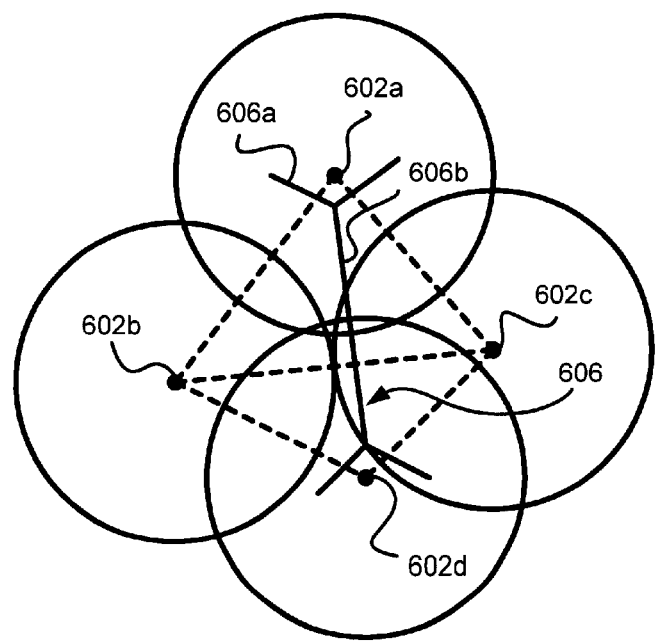

Therefore, referring to FIG. 6D, the seed points 602a, 602b are connected since the connector (dashed line in the figure) bisects edge 606a of the Voronoi diagram. A similar condition holds for each of the other connectors. In contrast to this, the seed points 602a and 602d are not connected, since the resulting connector would be parallel with and not bisect the edge 606b of the Voronoi diagram.

Through the use of the Voronoi diagram, the ambiguity illustrated in relation to FIGS. 6A and 6B is resolved in favor of a triangular mesh representation which achieves an optimal aspect ratio in this particular implementation.

Referring back to FIG. 2A, the polygons resulting from the selectively connecting step 214 comprise the mesh representation of the surface derived in step 202. Compared to the mesh representation formed through the prior art Marching Cubes algorithm, the mesh representation produced through the method of FIG. 2A is generally composed of fewer polygons, and polygons (or triangles) with better aspect ratios.

Note that the mesh representation which results may be further subdivided to achieve higher and progressively increasing levels of resolution. FIGS. 7A–7D, for example, illustrate progressively finer resolution triangular mesh representations of the human brain. These progressively finer resolution representations may be grouped together and retained for certain applications, such as transmission over the Internet, where it may be desirable to rapidly display a coarse representation of an object, and then progressively display finer and finer detailed resolutions of the object. The subdivided mesh representations can facilitate this process.

Figure 8:
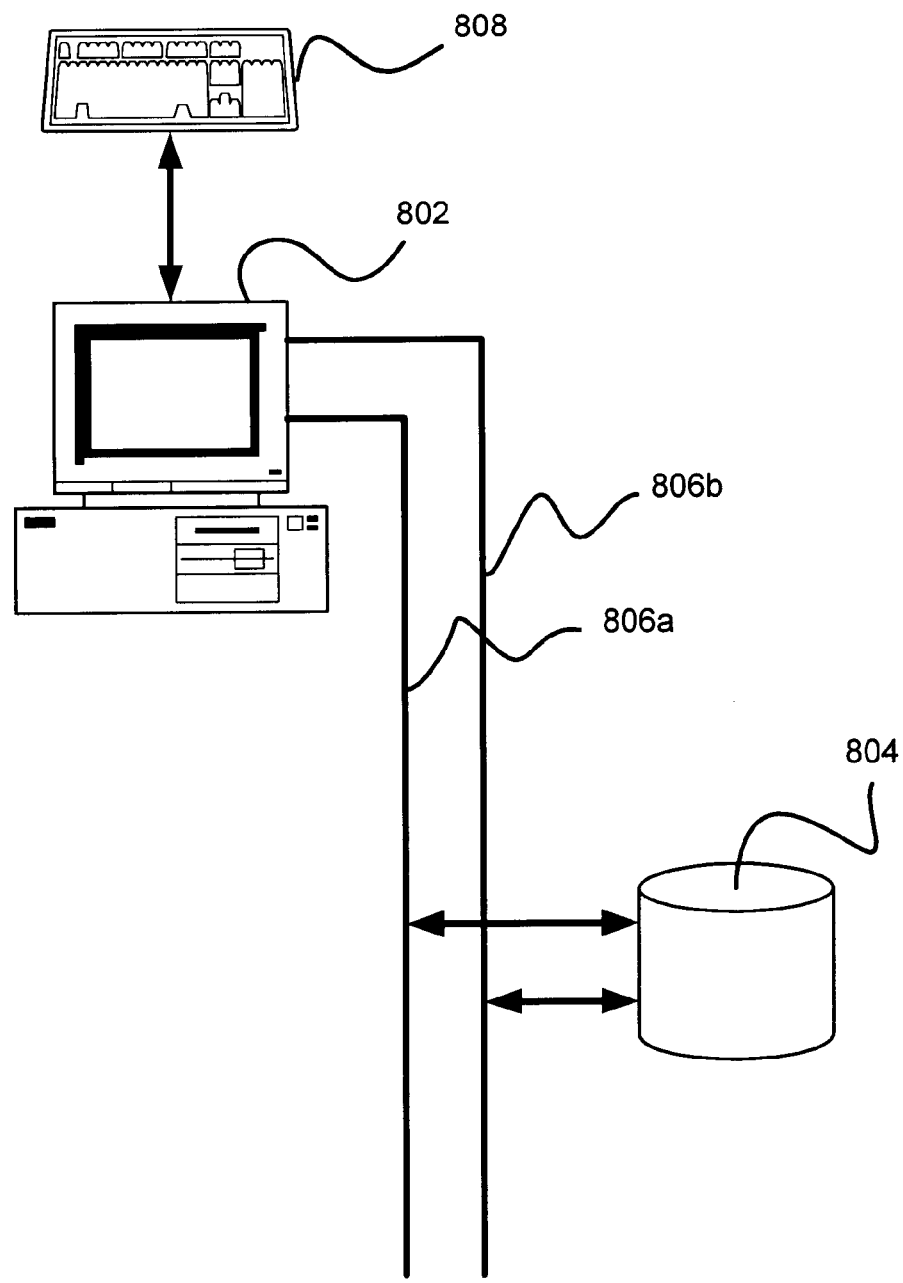
FIG. 8 is a simplified block diagram of an embodiment of a system according to the invention.

FIG. 8 illustrates one embodiment of a system according to the invention. As illustrated, in this embodiment, the system comprises processor 802, memory 804, and user interface 808. The memory 804 is coupled to processor 802 through address bus 806a and data bus 806b. In this embodiment, any of the previously described methods may be tangibly embodied as a series of instructions stored in memory 804. These instructions are accessible to processor 802 through suitable accesses on address bus 806a and data bus 806b. The user interface 808 may be any suitable interface for allowing a user to input information to processor 802 and/or allowing processor 802 to provide or display information to a user, including but not limited to a display, keyboard, mouse, touch-screen, or the like.

In operation, a user may input to the processor 802 one or more conditions or constraints to be satisfied by a mesh representation, and also input a volumetric representation of an object. The processor 802 retrieves the instructions stored in memory 804 and executes them, thus performing the method according to the invention. In particular, the processor may derive a surface from the volumetric representation, and extract therefrom (and optionally refine) a mesh representation of the surface which satisfies, to the extent possible, the conditions or constraints input by the user. In one implementation, this process may be performed automatically, without any involvement by the user (other than inputting information, such as applicable constraints or conditions, or iso-values characteristic of the desired surface, at the inception of the process).

In the case in which the volumetric representation comprises a plurality of voxels, each associated with a point in space and an iso-value, the processor may derive from the voxels an iso-surface using one or more iso-values specified by the user over the user interface 808, and characteristic of the surface which is desired. The processor may then derive a mesh representation of this surface in the manner described previously. Once derived, the mesh representation may be subdivided and/or displayed.

Figure 9:
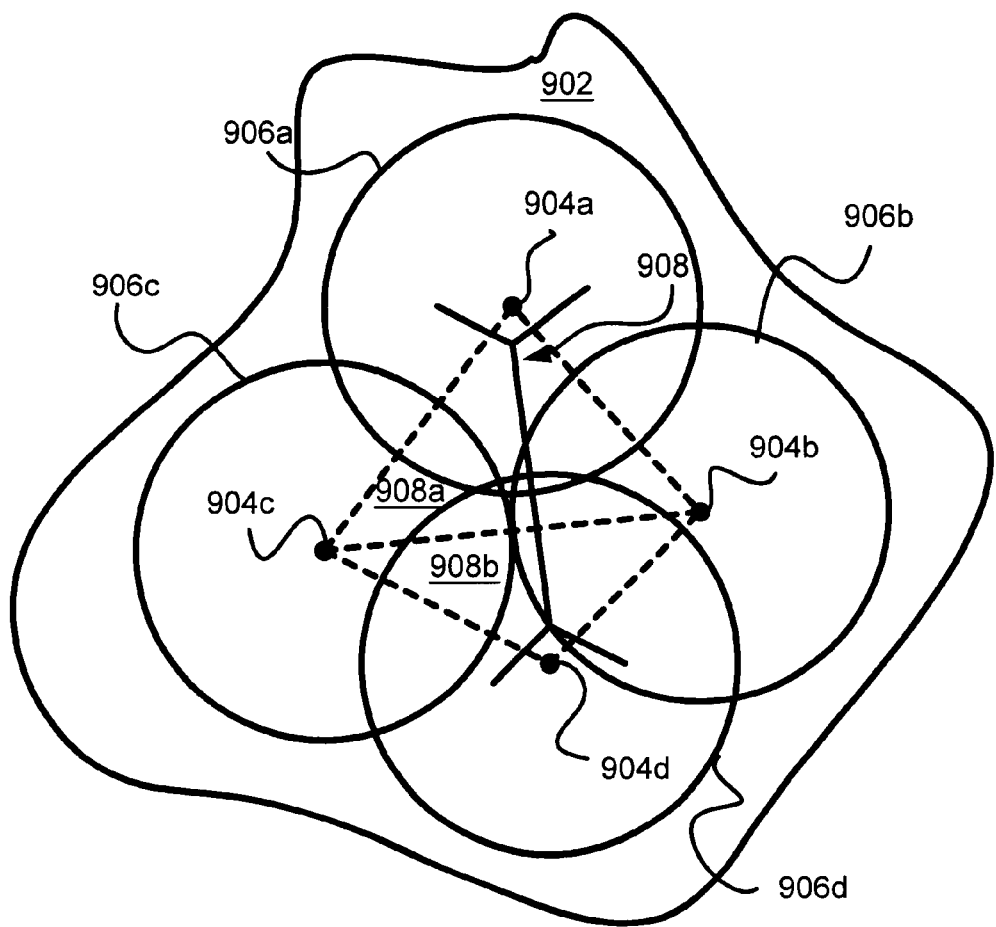
FIG. 9 is a simplified diagram of an embodiment of a data structure according to the invention.

Referring to FIG. 9, an embodiment of a data structure according to the invention comprises first data representative of a surface 902; second data representative of seed points 904a, 904b, 904c, 904d on the surface; third data representative of neighborhoods 906a, 906b, 906c, and 906d grown from the seed points and substantially covering the surface 902; and fourth data representative of polygons 908a, 908b formed by selectively connecting the seed points with connectors, the polygons comprising the mesh representation.

In this data structure, the surface 902 may be an iso-surface. Moreover, in one implementation, the data structure may further comprise data representative of a Voronoi diagram 908 formed from the seed points. In this implementation, the fourth data is representative of polygons formed by connecting those seed points where the connectors bisect edges of the Voronoi diagram 908. The foregoing data structure may be tangibly embodied through storage thereof in a memory.

While various embodiments of the invention have been described, it will be apparent to those of ordinary skill in the art that many more embodiments and implementations are possible that are within the scope of this invention.

What is claimed is:

1. A method of extracting a mesh representation of a surface from a volumetric representation of at least a portion of an object comprising:

deriving a surface from the volumetric representation;

selecting a seed point on the surface;

growing a neighborhood of the seed point over at least a portion of the surface;

iteratively repeating the foregoing selecting and growing steps until the entire surface is substantially completely covered; and selectively connecting seed points with connectors, thereby forming polygons which comprise the mesh representation.

2. The method of claim 1 wherein the volumetric representation comprises a plurality of voxels, each associated with a point in space and having an iso-value, and the deriving step comprises deriving an iso-surface from the voxels.

3. The method of claim 1 further comprising deriving a Voronoi diagram from the resultant seed points, wherein the selectively connecting step comprises connecting those seed points where the connectors bisect edges in the Voronoi diagram.

4. The method of claim 1 wherein the mesh representation comprises a plurality of tessellated polygons.

5. The method of claim 4 wherein the mesh representation comprises a plurality of tessellated triangles.

6. The method of claim 1 wherein the neighborhood is in the form of a disk.

7. The method of claim 1 wherein the neighborhood is in the form of a sphere.

8. The method of claim 6 wherein the growing step comprises growing the disk over at least a portion of the surface which is isomorphic to a plane.

9. The method of claim 1 wherein the growing step further comprises decreasing the size of the neighborhood by a predetermined amount if a predefined constraint or condition is encountered.

10. The method of claim 6 wherein the growing step further comprises decreasing the radius of the disk by a predetermined amount if the disk is determined to no longer cover a portion of the surface which is isomorphic to a plane.

11. The method of claim 6 wherein the growing step further comprises decreasing the radius of the disk by a predetermined amount if the disk boundary is determined to have contacted itself.

12. The method of claim 6 wherein the growing step further comprises decreasing the radius of the disk by a predetermined amount if a determination is made that a triangle aspect ratio restriction is likely to be violated.

13. The method of claim 6 wherein the growing step further comprises decreasing the radius of the disk by a predetermined amount if the ratio of the radius of the disk to that of an intersecting disk equals or exceeds a predetermined ratio.

14. The method of claim 6 wherein the growing step further comprises decreasing the radius of the disk by a predetermined amount if a determination is made that the disk and an adjacent disk generate more than one boundary between regions on the surface.

15. The method of claim 1 further comprising refining the resultant neighborhoods to satisfy one or more additional constraints or conditions, and re-forming the mesh representation.

16. The method of claim 1 tangibly embodied as a series of instructions stored in a memory.

17. A system comprising a processor and the memory of claim 16, wherein the processor is configured to access and execute the instructions stored in the memory.

18. A system for extracting a mesh representation of a surface from a volumetric representation of at least a portion of an object comprising:
   first logic for deriving a surface from the volumetric representation;
   second logic for selecting a seed point on the surface;
   third logic for growing a neighborhood of the seed point over at least a portion of the surface;
   fourth logic for iteratively repeating the foregoing selecting and growing steps until the entire surface is substantially completely covered; and
   fifth logic for selectively connecting seed points with connectors, thereby forming polygons which comprise the mesh representation.

19. The system of claim 18 wherein the volumetric representation comprises a plurality of voxels, each associated with a point in space and an iso-value, and the first logic is configured to derive the surface which is an iso-surface from the voxels.

20. The system of claim 18 further comprising logic for deriving a Voronoi diagram from the resultant seed points, and the fifth logic is configured to connect those seed points where the connectors bisect edges in the Voronoi diagram.

21. The system of claim 18 wherein the third logic is configured to grow a neighborhood which is in the form of a disk.

22. The system of claim 18 wherein the third logic is configured to grow a neighborhood which is in the form of a sphere.

23. The system of claim 21 wherein the third logic is configured to grow the disk over at least a portion of the surface which is isomorphic to a plane.

24. The system of claim 18 wherein the third logic in configured to reduce the size of the neighborhood by a predetermined amount if a predefined constraint or condition is encountered.

25. The system of claim 21 wherein the third logic is configured to decrease the radius of the disk by a predetermined amount if the disk is determined to no longer cover a portion of the surface which is isomorphic to a plane.

26. The system of claim 21 wherein the third logic is configured to decrease the radius of the disk by a predetermined amount if the disk boundary is determined to have contacted itself.

27. The system of claim 21 wherein the third logic is configured to decrease the radius of the disk by a predetermined amount if a determination is made that a triangle aspect ratio restriction is likely to be violated.

28. The system of claim 21 wherein the third logic is configured to decrease the radius of the disk by a predetermined amount if the ratio of the radius of the disk to that of an intersecting disk equals or exceeds a predetermined ratio.

29. The system of claim 21 wherein the third logic is configured to decrease the radius of the disk by a predetermined amount if a determination is made that the disk and an adjacent disk generate more than one boundary between regions on the surface.

30. The system of claim 18 further comprising sixth logic for refining the resultant neighborhoods to satisfy one or more additional constraints or conditions, and re-forming the mesh representation.

31. A processor readable medium tangibly embodying a data structure comprising a mesh representation of a surface comprising:
   first data representative of a surface;
   second data representative of seed points on the surface;
   third data representative of neighborhoods grown from the seed points and substantially completely covering the surface; and
   fourth data representative of polygons formed by selectively connecting seed points with connectors, the polygons comprising the mesh representation.

32. The medium of claim 31 wherein the surface is an iso-surface.

33. The medium of claim 31 further comprising data representative of a Voronoi diagram formed from the seed points, wherein the fourth data is representative of polygons formed by connecting those seed points where the connectors bisect edges of the Voronoi diagram.

34. The medium of claim 31 comprising a memory selected from the group comprising RAM, ROM, PROM, EPROM, EEPROM, hard disk, floppy disk, CD-ROM, DVD, and flash memory.

35. A method of extracting a mesh representation of a surface from a volumetric representation of at least a portion of an object comprising:
   a step for deriving a surface from the volumetric representation;
   a step for selecting a seed point on the surface;
   a step for growing a neighborhood of the seed point over at least a portion of the surface;
   a step for iteratively repeating the foregoing selecting and growing steps until the entire surface is substantially completely covered; and
   a step for selectively connecting seed points with connectors, thereby forming polygons which comprise the mesh representation.

36. The method of claim 35 wherein the volumetric representation comprises a plurality of voxels, each associated with a point in space and an iso-value, and the step for deriving comprises deriving the surface which is an iso-surface from the voxels.

37. The method of claim 35 further comprising a step for deriving a Voronoi diagram from the resultant seed points, wherein the step for selectively connecting seed points comprises connecting those seed points where the connectors bisect edges of the Voronoi diagram.

38. A system for extracting a mesh representation of a surface from a volumetric representation of at least a portion of an object comprising:

first means for deriving a surface from the volumetric representation;

second means for selecting a seed point on the surface;

third means for growing a neighborhood of the seed point over at least a portion of the surface;

fourth means for iteratively repeating the foregoing selecting and growing steps until the entire surface is substantially completely covered; and fifth means for selectively connecting seed points with connectors, thereby forming polygons which comprise the mesh representation.

39. The system of claim 38 wherein the volumetric representation comprises a plurality of voxels, each associated with a point in space and an iso-value, and the first means is configured for deriving the surface which is an iso-surface from the voxels.

40. The system of claim 38 further comprising means for deriving a Voronoi diagram from the resultant seed points, wherein the fifth means is configured for connecting those seed points where the connectors bisect edges in the Voronoi diagram.

* * * * *